(12) United States Patent
Bell (10) Patent No.: US 6,612,389 B1
(45) Date of Patent: Sep. 2, 2003

(54) COMBINATION TRAILER AND TWO-WHEEL CONVERSION UTILITY FOR A MOTORCYCLE

(76) Inventor: David Anthony Bell, P.O. Box 344, Cadiz, KY (US) 42211

( * ) Notice: Subject to any disclaimer, the term of this patent is extended or adjusted under 35 U.S.C. 154(b) by 0 days.

(21) Appl. No.: 10/083,956

(22) Filed: Feb. 27, 2002

(51) Int. Cl.[7] .............................................. B62K 27/12
(52) U.S. Cl. ..................... 180/209; 280/656; 280/789; 280/204; 280/293; 280/295; 280/767
(58) Field of Search ................................. 280/638, 656, 280/789, 204, 402, 293, 295, 767, 296, 297, 298, 304; 180/21, 16, 209; 296/35.3, 182

(56) References Cited

U.S. PATENT DOCUMENTS 1,311,816 A * 7/1919 Heintz ......................... 280/204
3,625,545 A * 12/1971 Somers et al. ............... 280/170
5,853,057 A * 12/1998 Mullins ........................ 180/16

* cited by examiner

Primary Examiner—Paul N. Dickson
Assistant Examiner—Ruth Ilan

(57) ABSTRACT

This lightweight, compact, two-wheel conversion utility is specifically designed to serve as a dual-purpose device for use with a motorcycle. First, the structural design is such that a removable rail tongue hitch is fitted to the proposed invention allowing the conversion utility to be used as a carrier trailer for the motorcycle until arriving at the desired destination. There, the rail tongue hitch is detached from the frame, the motorcycle is backed between the two wheels of the utility, and is quickly and easily mounted to the rear axle and frame, thus converting the carrier trailer to a stabilizer for the motorcycle giving it a three wheel appearance. This makes it capable of increasing load capacity and less likely to overturn. The wheels are located on the outside of the conversion utility's frame and are laterally spaced apart on opposite sides of the rear wheel of the motorcycle.

5 Claims, 12 Drawing Sheets

COMBINATION TRAILER AND TWO-WHEEL CONVERSION UTILITY FOR A MOTORCYCLE

CROSS REFERENCE TO RELATED APPLICATIONS

Nonapplicable

STATEMENT OF FEDERALLY SPONSORED RESEARCH/DEVELOPMENT

Nonapplicable

REFERENCE TO A "SEQUENCE LISTING," A TABLE, ETC.

Nonapplicable

BACKGROUND OF THE INVENTION

The present invention relates to a lightweight, compact, two-wheel conversion utility specifically designed to serve a dual purpose. First, it attaches to a car, truck, or other vehicle using a single unit rail tongue hitch. When used in this manner, it becomes a carrier trailer designed to haul a motorcycle or other two-wheel vehicle. Upon arriving at one's destination, the rail tongue hitch is removed, the motorcycle is backed between the two wheels of the conversion utility, and the utility is connected to the motorcycle's rear axle and frame. When used in this manner, the conversion utility becomes a stabilizer for the motorcycle giving it a three-wheel appearance.

The inventor is aware of only one other similar design, U.S. Pat. No. 5,853,057. First, this patent is at a disadvantage because it does not serve a dual purpose. Therefore, it may not be used as a carrier trailer to haul a two-wheel vehicle, namely the motorcycle to its destination. This results in a person having to locate and obtain storage, security, and space for the carrier trailer. Using the proposed invention, there is no need for a separate carrier trailer or space to store it.

Next, the proposed invention is also designed to be use used as a multifunctional carrier. Using the proposed invention's slide-in receiver hitch mountings, a small camper or trailer, as well as, such optional accessories as a slide-in tool box, a slide-in cooler carrier, a slide-in luggage carrier, a slide-in bicycle rack, a slide-in wire basket, etc. may quickly and easily be mounted to the lateral rear cross member frame of the conversion utility holding them securely in place, thus making it a more versatile piece of equipment than the previous patent. Lastly, the luggage rack mounting on U.S. Pat. No. 5,853,057 is much taller than the optional slide in luggage carrier on the present invention. The advantage of a smaller design is that it is more aerodynamically sound, consequently lowering the risk of detachment by the wind or wind damage.

Other observable differences in the actual physical structural design are that U.S. Pat. No. 5,853,057 uses a larger frame structure, mounting plate, rear swing arm connection, and an additional brake system. The present invention uses a smaller, lightweight, and more compact structural frame. It is specifically designed this way to provide a stronger support in a smaller space; and as a result, one man can attach and detach it easily by himself. This smaller, compact design also allows the conversion utility to appear to be part of the motorcycle, not an add on. This makes it more appealing for most riders, as it does not present a "training wheel" appearance. The previous patent uses a thick metal mounting plate that is bracing a piece of square tubing. Nuts are fixed on each side to accept a connector bolt. The proposed invention uses a thinner metal plate with no reinforcement and a singular piece of square stock centered and welded to the plate. Either end of the square stock is drilled and tapped to accept the bolts. This is preferable because it is lighter on the motorcycle and provides more strength for the attachment of the proposed invention than does the previously described mounting plate.

The previous patent also uses a rear swing arm connection comprised of a bracket located in front of the rear drive wheel attached to the swing arm that allows the connection of the invention directly to the motorcycle. The proposed invention, on the other hand, uses a buttress that is actually attached to the rear drive axle. The buttress has a nut welded to its lower portion that allows for a connection and adjustment point for the roller bearing assembly. This is advantageous because the roller bearing assembly provides the connection point for the stabilization and suspension system. The stabilization system provides a direct connection to the rear lateral cross member and to the motorcycle. The proposed invention has a suspension system comprised of rear leaf springs, a u-shaped bearing receiver, and a hinge, bolt, and nut adjustment. This is preferable because it allows for tension adjustment after the conversion utility is mounted, requiring only seconds to adjust, and allowing for continual adjustment if necessary without detaching it from the motorcycle. As opposed to no suspension on the previous invention, this rear suspension design also provides lateral stabilization for the proposed invention. This ensures that equal pressure is applied to both of the supplemental rear wheels causing them to maintain contact with the ground allowing equal wear. This design also ensures that the conversion utility's wheels work together with each other and with the rear wheel of the motorcycle. This design stabilizes the motorcycle and provides independent suspension for the supplemental wheels and therefore, does not rely on the motorcycle's suspension.

Due to the size and structural design, the present invention does not require a separate Us brake system as does the previous patent. The present invention has a custom designed fender added as a safety and appearance feature. It prevents accidents from occurring by debris being picked up by the supplementary wheels and thrown on the rider, passenger, or oncoming and following traffic. The taillight (brakes and running lights) also provides a safety and appearance feature. It alerts following traffic that there is a vehicle in front of them and as to the width of the conversion utility. A wiring harness that is custom designed to each application is used to connect the lights on the proposed invention to those of the motorcycle.

BRIEF SUMMARY OF THE INVENTION

The proposed invention is a lightweight, two-wheel conversion utility designed to provide stability to a motorcycle, giving it a three-wheel appearance, without damaging or altering the existing structure of that motorcycle in any way, thus making this more economically sound for the motorcycle owner. It is also designed as a carrier for that motorcycle until reaching its desired destination, where the motorcycle is unloaded from the trailer, the trailer is unhitched from the car or truck, the rail tongue hitch is removed from the trailer, the motorcycle is then backed into the trailer (conversion utility) between the two wheels, and mounted to the plate underneath the frame of the motorcycle and to the rear axle by the buttress. Thus, only one trailer (conversion utility) is needed for both tasks making this a dual purpose mechanism. The lightweight, compact design, ease of use, and provided stability are considered important safety features especially for disabled/handicapped riders, older riders, and men or women who want to ride a motorcycle but are not comfortable doing so on two wheels.

DETAILED DESCRIPTION OF THE INVENTION

The proposed invention 2 which gives the motorcycle 4 a three-wheel appearance is comprised of two side legs 20. These legs 20 are located on either side of the motorcycle 4 and have an attachment point 46 for the supplementary wheels 16. When connected to the motorcycle 4, gives it the three-wheel appearance.

The frame 14 is rectangular in shape and has two longitudinally placed side legs 20, one on the right and one on the left side of the motorcycle 4. The legs 20 are connected at the rear by a laterally extending cross member 18. The legs 20 are then connected at the lower mid point of the motorcycle 4 by a mounting plate assembly 38.

Figure 10:
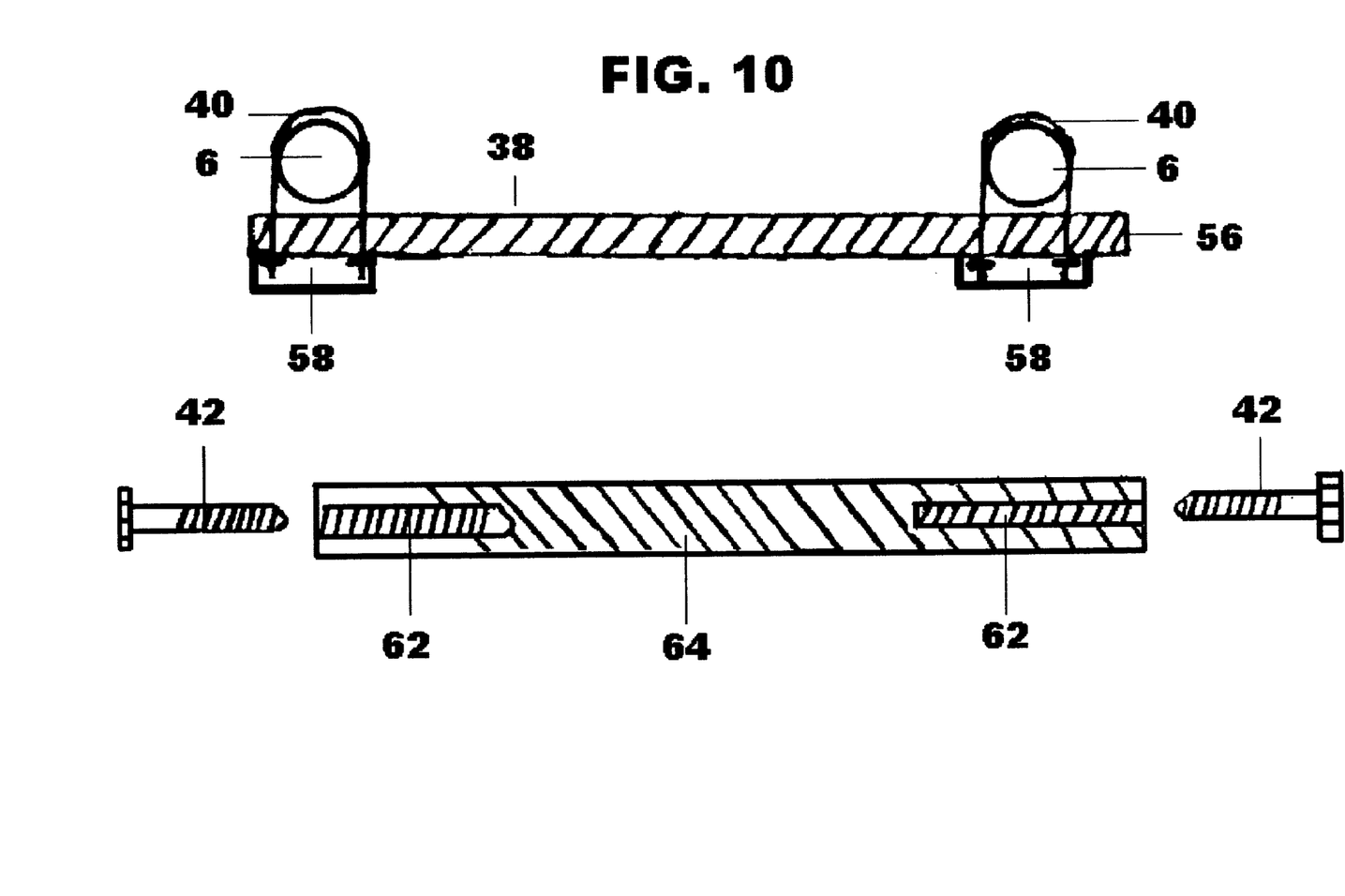
FIG. 10 is sectional view of the mounting plate assembly.

The side legs 20 converge inwardly three quarters of the way up the frame 14. This provides for the connection on the lower mid section of the motorcycle 4 by a mounting plate assembly 38. The mounting plate assembly 38 is comprised of a thick metal plate 56, a piece of drilled and tapped 62 tubular stock 64. The assembly 38 has spacing pieces 58 specifically designed for each application. The mounting assembly 38 is then attached to the motorcycle's frame 6 by a series of u-bolts 40. This provides for the conversion utility 2 to be connected to the motorcycle 4 by means of mounting eyelets 26, bolts 42, and bracing 44.

The conversion utility's 2 side legs 20 have a laterally extending support member 12 that connects to the frame 14 a short distance from the connecting eyelets 26.

The frame 14 has two rotatable axle connections 46 located on either side of the motorcycle 4 and are attached to the side legs 20 at a point where they are in line with the rear drive wheel 10 of the motorcycle 4.

Figure 5:
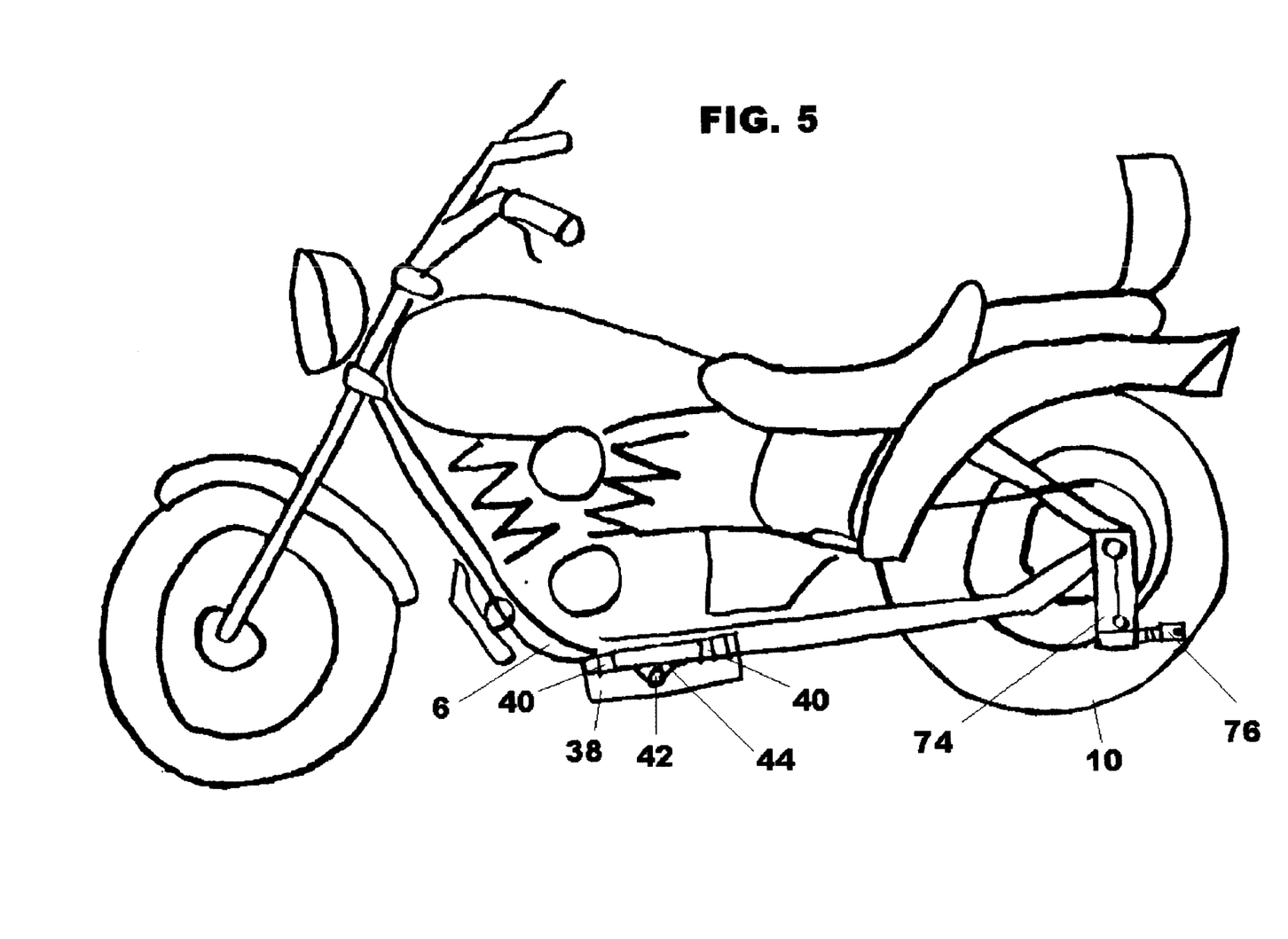
FIG. 5 is a side view illustrating connection points of the invention.
Figure 6:
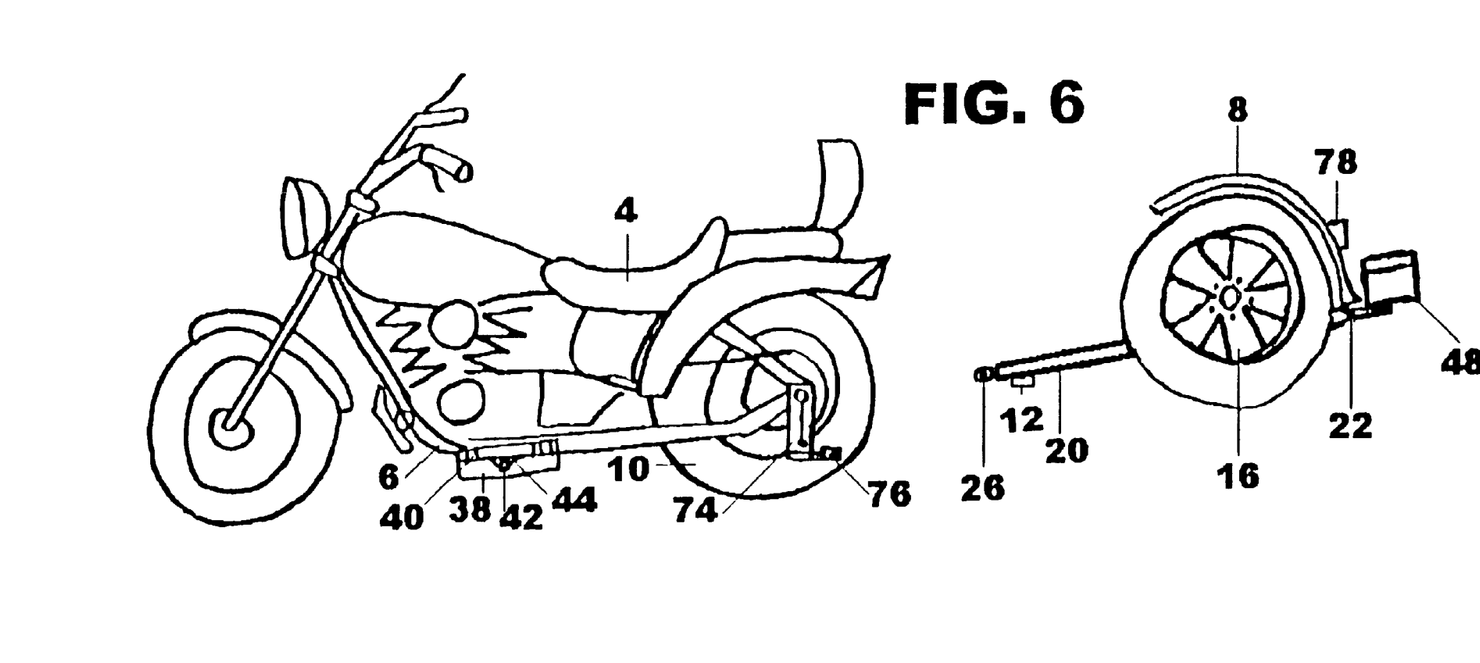
FIG. 6 is a side view of the conversion utility and motorcycle.
Figure 11:
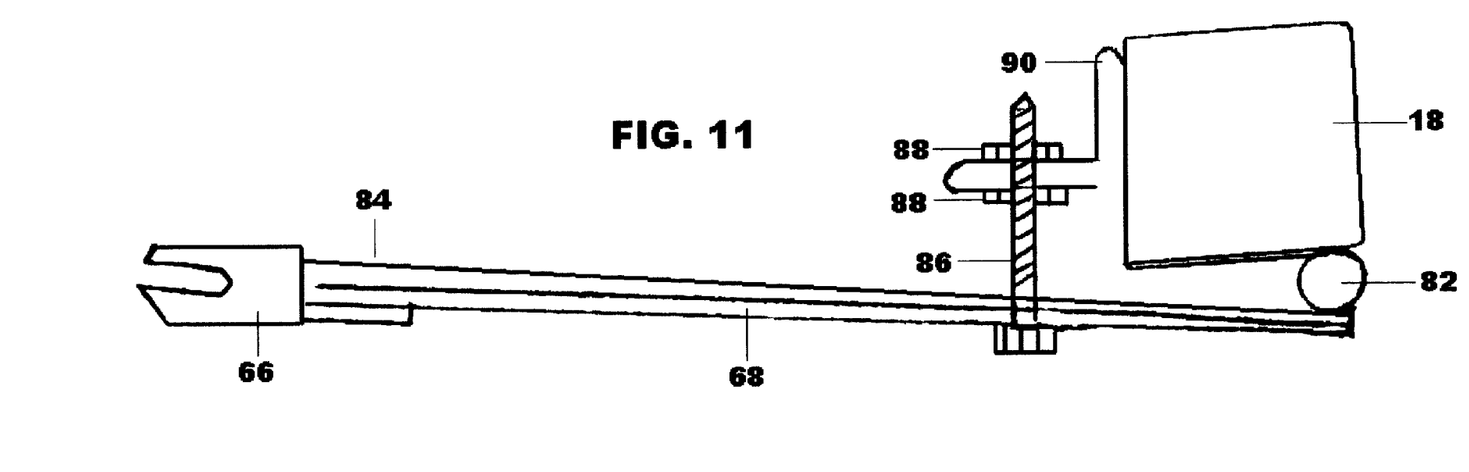
FIG. 11 is a side view of the stabilization and suspension system.

The conversion utility 2 is connected to the rear of the motorcycle 4 by means of a buttress 74. The buttress 74 has a connection point at the motorcycle's rear drive wheel 10 axle. At this point, a roller bearing assembly 76 is screwed into the buttress nut 102 providing a connection to the suspension and stabilization system 84 which provide a direct connection to the frame 14.

Figure 12:
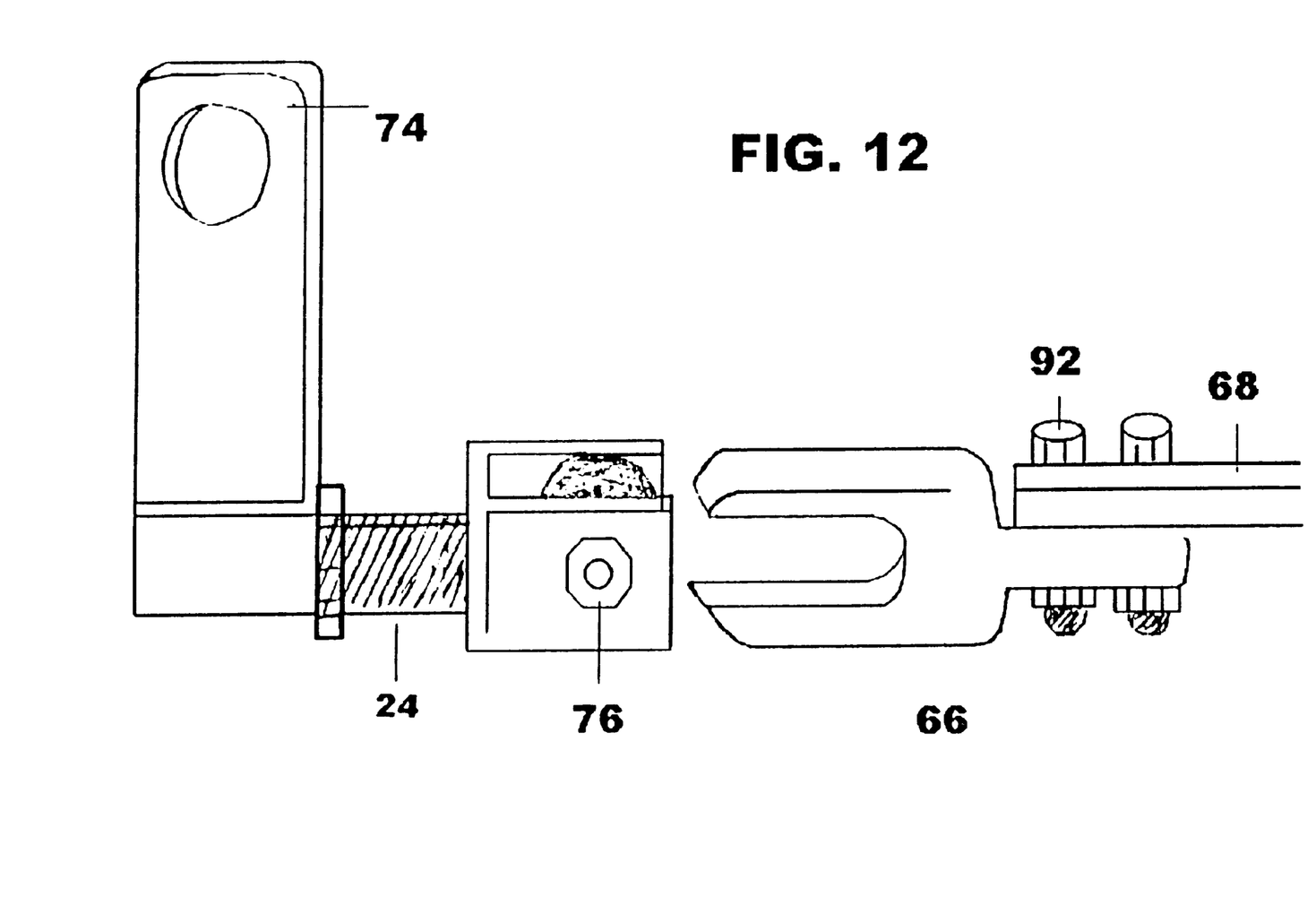
FIG. 12 is a side view of the roller bearing and suspension connection assembly.
Figure 13:
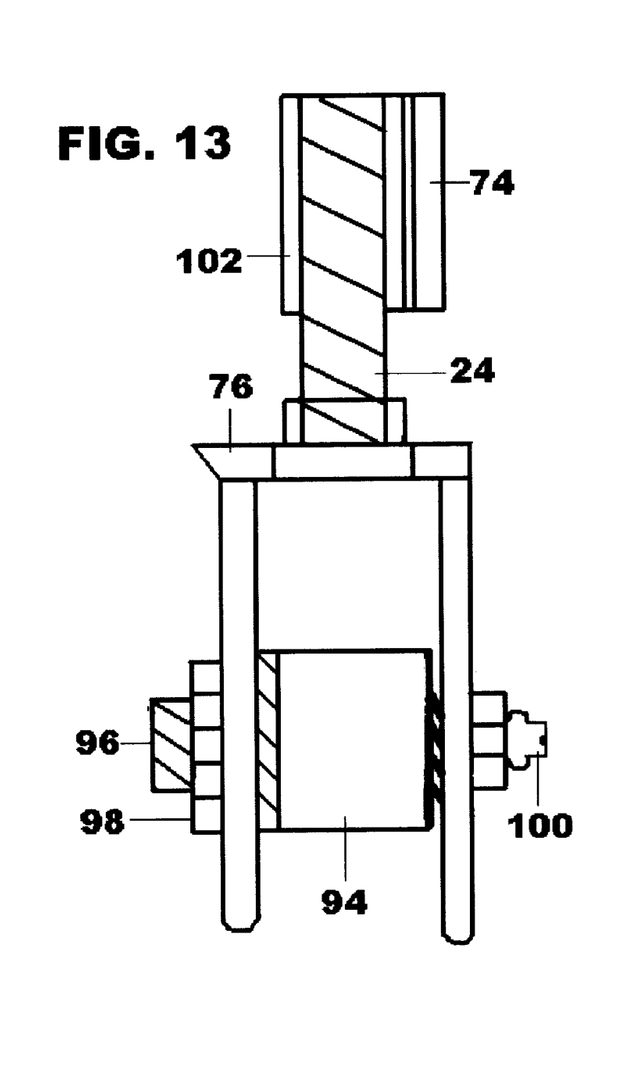
FIG. 13 is a top view of the roller bearing assembly.
Figure 14:
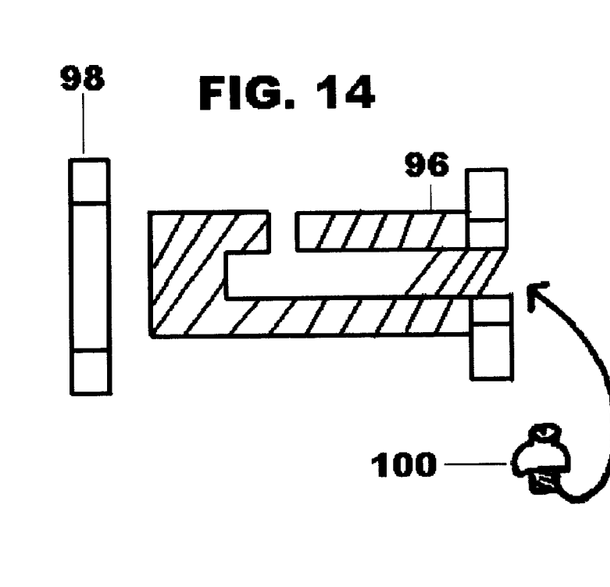
FIG. 14 is a sectional view of the lubricating bolt.

The roller bearing assembly 76 is comprised of a lubricating bolt 96, a roller bearing sleeve 94, an adjustment screw 24, and a grease fitting (zerk) 100. The assembly 76 is held together by a lubricating bolt nut 98.

The rear suspension and stabilization system 84 is comprised of rear leaf springs 68 that are attached to a u-shaped connector 66 in the front by connecting bolts 92. The leaf springs 68 are then connected to the hinge in the back 82. This hinge 82 is then attached to the rear lateral cross member 18. The lateral extending cross member 18 has an adjustment plate 90 attached to it to provide for the adjustment of the suspension and stabilization system 84 using tension adjustment bolts 86 and jam nuts 88.

Figure 7:
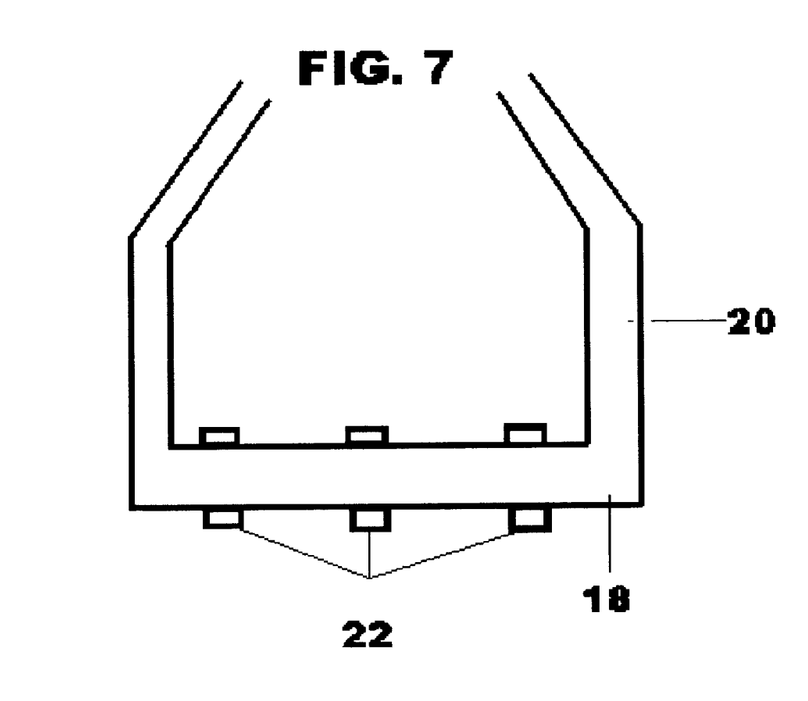
FIG. 7 is a top view of the receiver hitch mountings on the rear lateral cross member.
Figure 8:
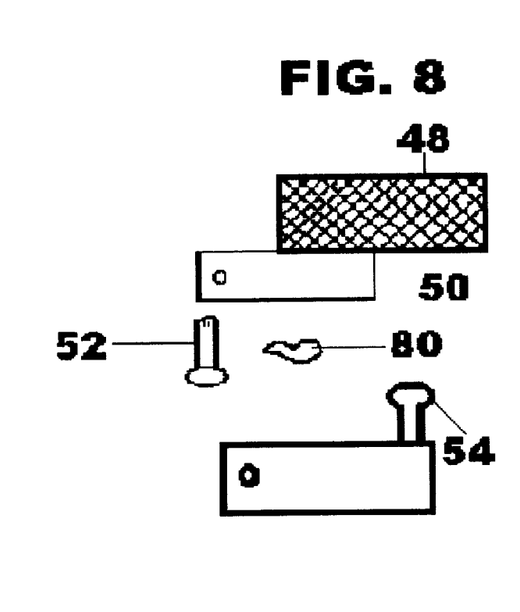
FIG. 8 is a side view of the ball mount receiving shaft.
Figure 9:
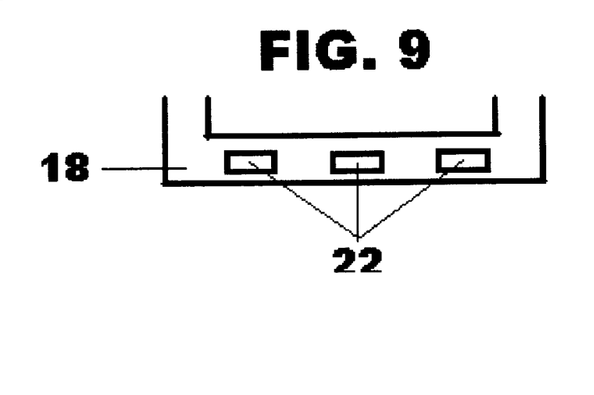
FIG. 9 is a rear view of the receiver hitch mountings on the rear lateral cross member.

Located within the lateral extending cross member 18 are a series of receiving hitch mountings 22. These provide for a shaft 50 attached to the optional accessories 48. The shaft 50 is inserted into the receiving hitch mounting 22 and held in place by a receiving pin 52 and a retaining clip 80. The receiving hitch mounting 22 may also hold an optional ball 54.

Figure 1:
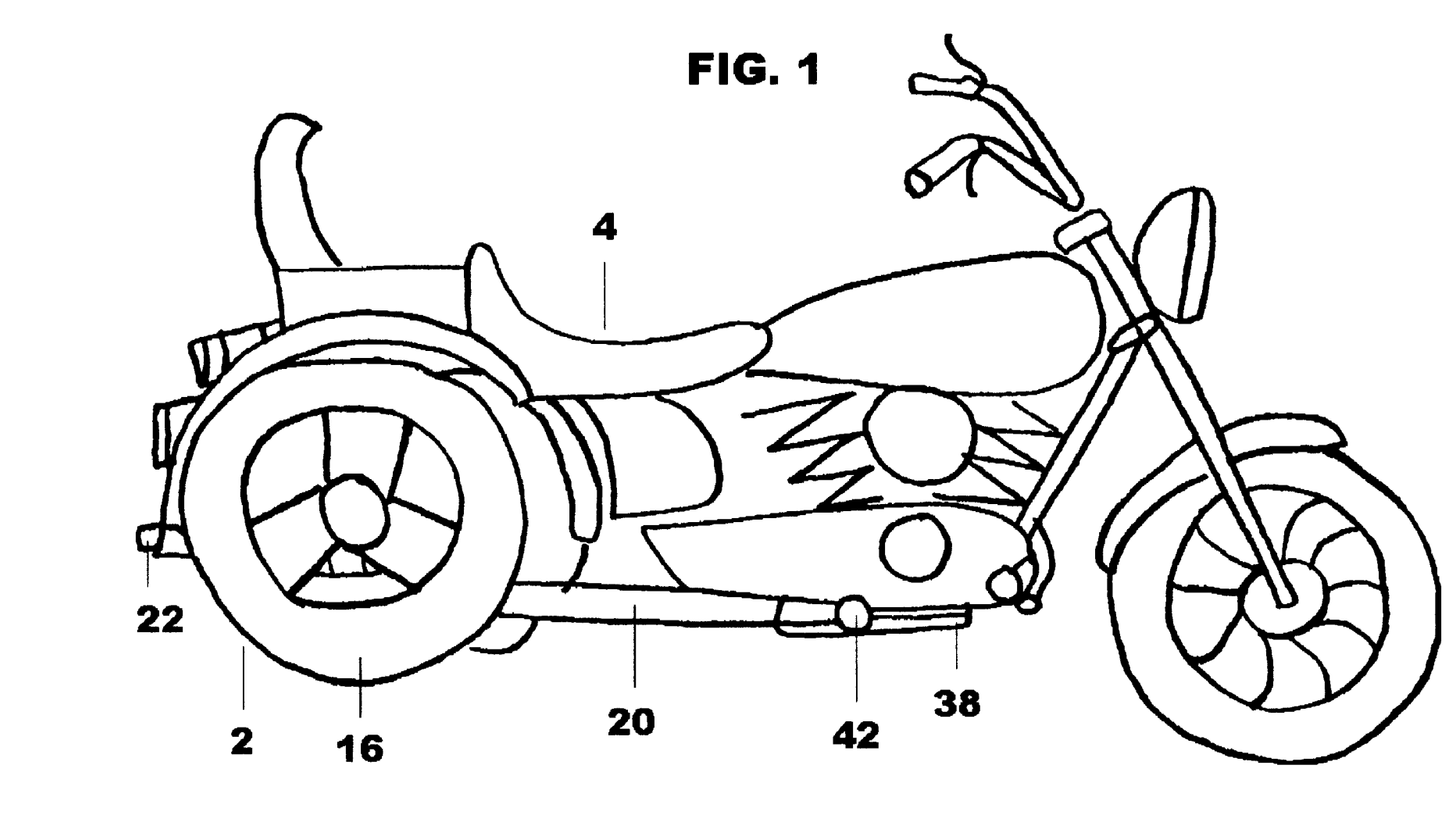
FIG. 1 is a side view of a preferred embodiment of this invention.
Figure 2:
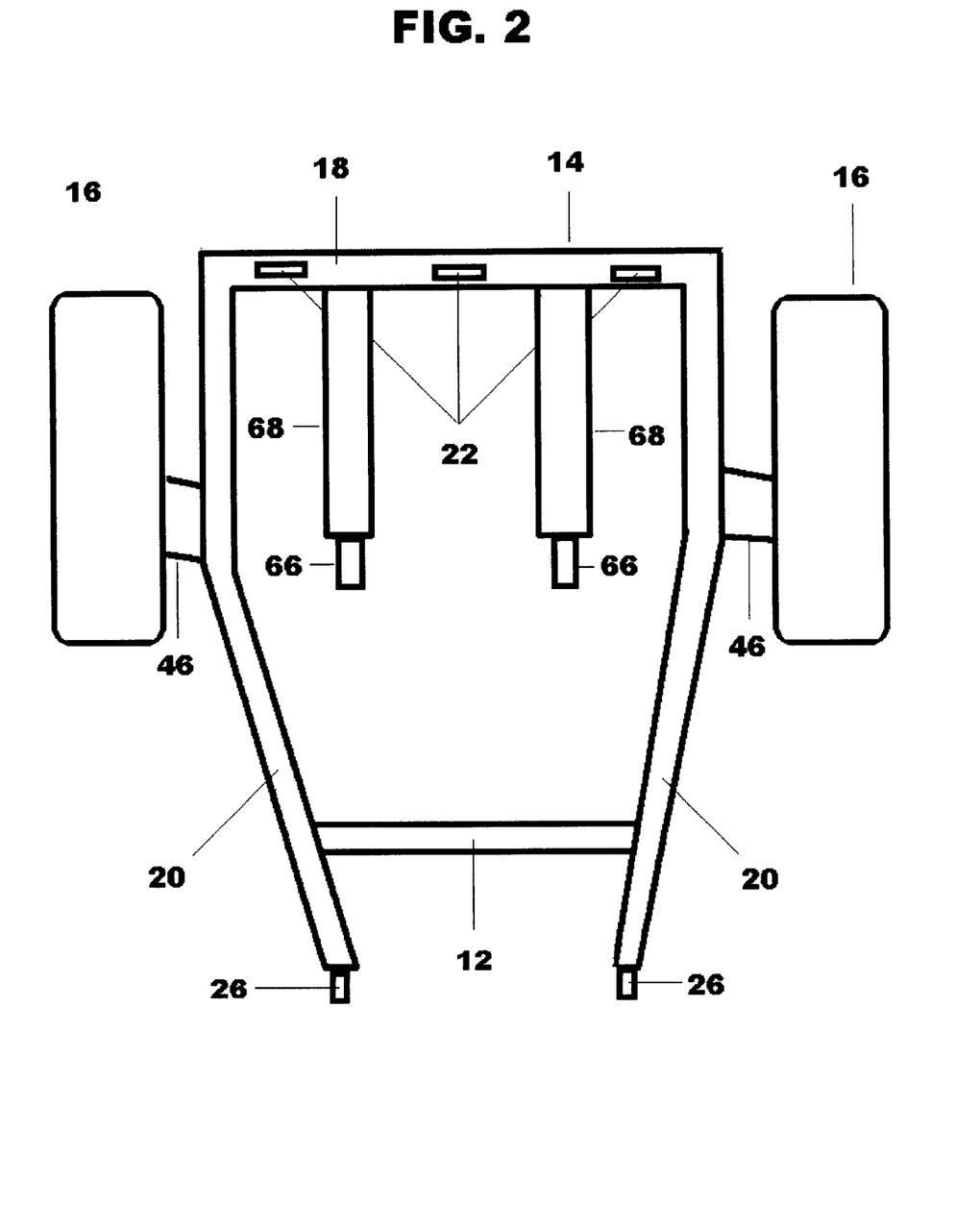
FIG. 2 is a top plan view of the conversion utility when used as a stabilizer for the motorcycle.
Figure 3:
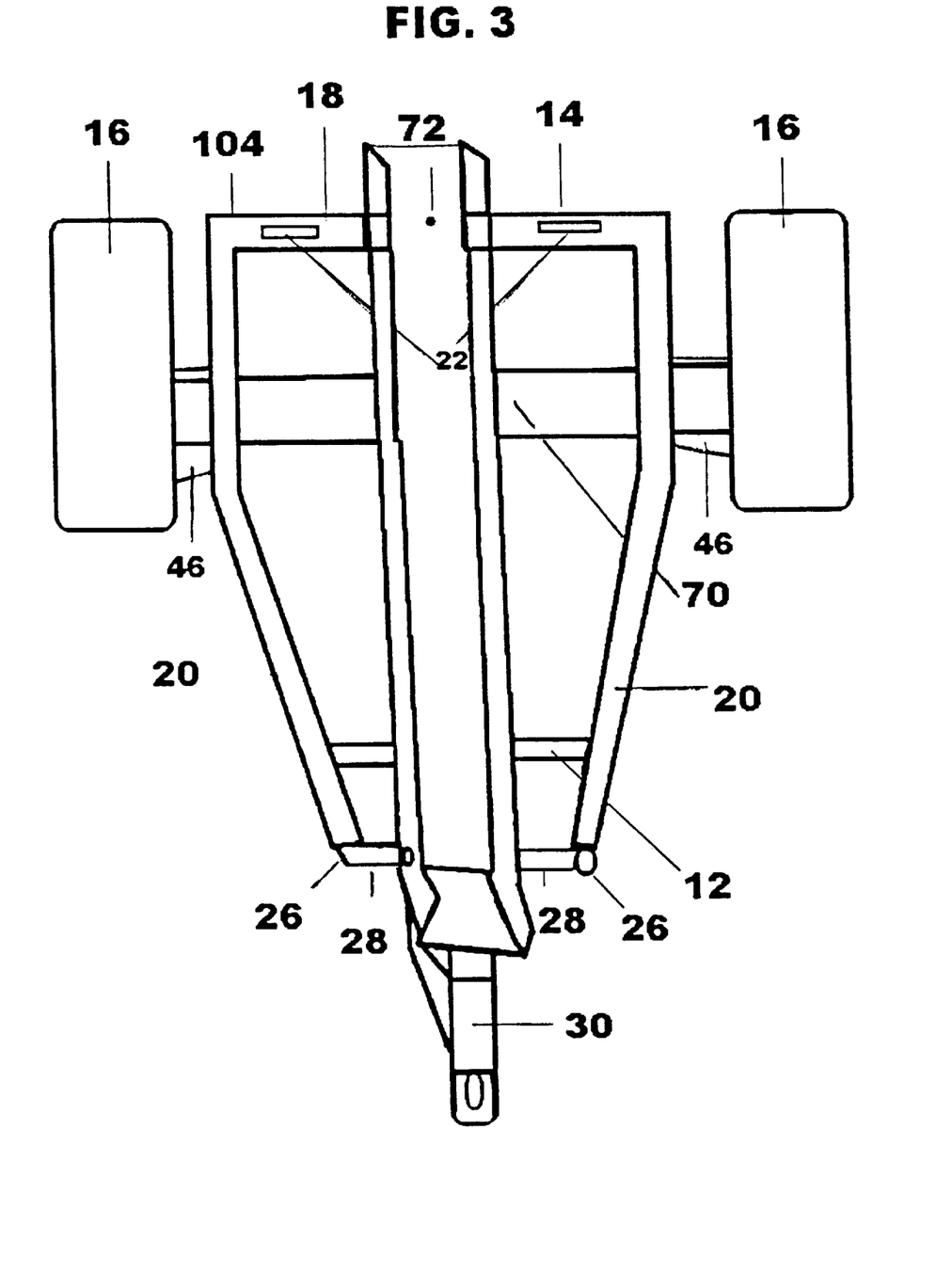
FIG. 3 is a top plan view of the conversion utility when used as a carrier trailer for a two-wheel vehicle, namely the motorcycle.
Figure 4:
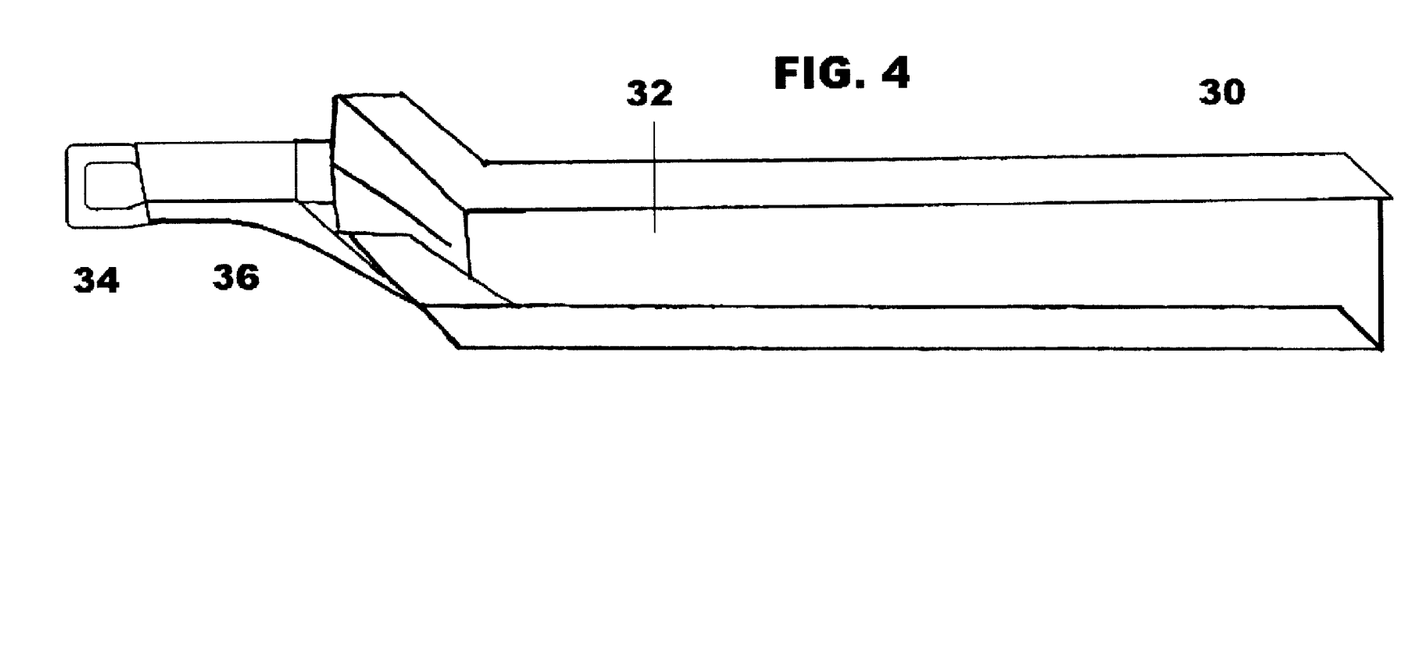
FIG. 4 is a perspective view of the single unit rail tongue hitch.

There is an optional single unit rail tongue hitch 30 that will convert the conversion utility 2 into a motorcycle carrier trailer 104. The single unit rail tongue hitch 30 is comprised of a single rail 32 that is attached to a hitch 34 and a tongue 36. This single unit rail tongue hitch 30 is attached to the conversion utility 2 by means of a connection rod 28 up front and a rear rail connector 72 in the back. Rail supports 12 and 70 are attached to the conversion utility 2 between the two side legs 20 of the conversion utility 2 to evenly distribute the weight of the motorcycle 4.

Figure 15:
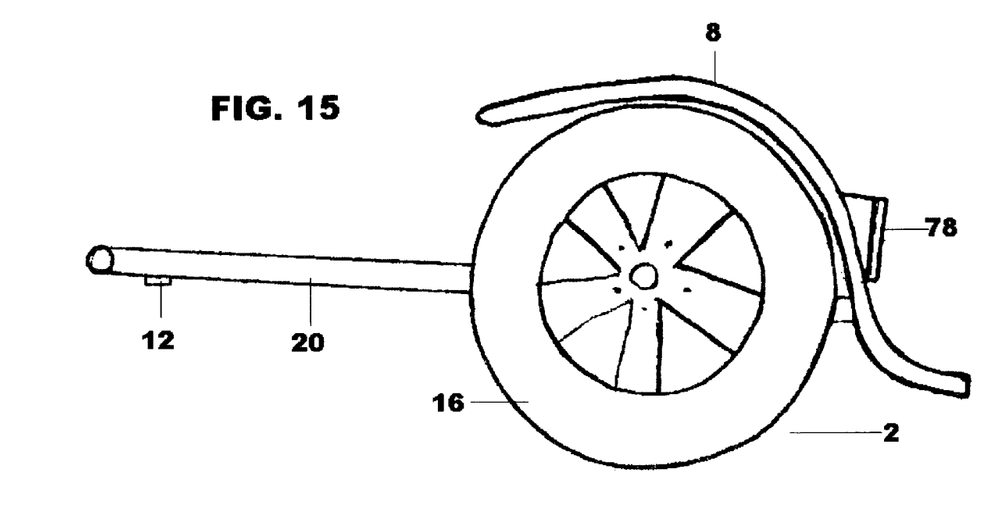
FIG. 15 is a side view of the flared fender on the conversion utility.
Figure 16:
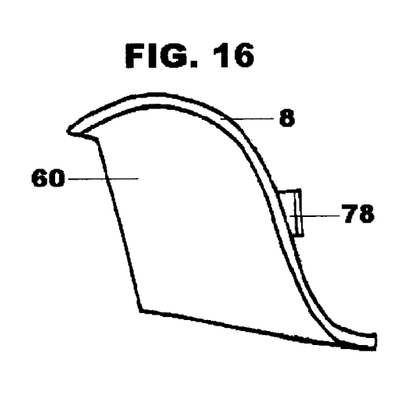
FIG. 16 is a side view of the flared fender.

The conversion utility 2 also has two fenders 8 that cover and protect the supplementary wheels 16. Located on these fenders 8 are a pair of tail lights 78 that add to the safety and appearance aspect of the conversion utility 2. Located on the inside of each fender is a splash guard 60 that keeps debris off of the motorcycle 4, rider, passenger, oncoming and following traffic.

What I claim as my invention is:

1. A combination trailer and two-wheel conversion utility for a motorcycle, the combination having two configurations and comprising:

A trailer frame including a rectangular section with a laterally extending cross member;

two longitudinally extending side legs extending from the rectangular section;

a laterally extending support member connected to and extending between the two side legs;

two wheels attached to each of the side legs, respectively;

a mounting assembly attached to a frame of the motorcycle, said mounting assembly comprising U-bolts and a plate and adapted to be attached to a longitudinally extending side legs;

a removable single rail tongue bitch comprising a single rail for supporting the motorcycle and a hitch and tongue attached at one end of the single rail;

a roller bearing assembly comprising a single sleeve placed onto a bolt; said bolt including a drilled shaft which is configured as a grease fitting;

a leaf spring suspension comprising a pair of leaf springs used to receive the motorcycle adapted to be connected to the rear axle of the motorcycle by buttresses;

wherein in the first configuration the combination trailer and two-wheel conversion utility is configured to carry the motorcycle on the single rail which is attached to the top of the trailer frame and supported by the laterally extending support member and an additional lateral support; and wherein in the second configuration each of the pair of leaf springs is connected to a bottom side of the laterally extending cross member at one end and connected to the roller bearing assembly at a second end; the roller bearing assembly is attached to the rear axle of the motorcycle and the longitudinally extending side legs are attached to the mounting assembly so that the combination trailer and two-wheel conversion utility is configured to provide additional wheels for stability during riding.

2. The combination trailer and two wheel conversion utility as claimed in claim 1 further comprising slide in receiver hitch mountings spaced along the laterally extending cross member and adapted to accept a shaft(s) attached to optional accessories.

3. The combination trailer and two wheel conversion utility as claimed in claim 1 wherein the connection of each of the pair of leaf springs to the bottom side of the laterally extending cross member comprises a hinge, an adjustment plate, and a tension adjustment bolt.

4. The combination trailer and two wheel conversion utility as claimed in claim 1 further comprising a flared fender.

5. The combination trailer and two wheel conversion utility as claimed in claim 1 further comprising a fender located adjacent each of the two wheels wherein each fender includes a taillight and a wiring harness.

* * * * *